Figure 1:
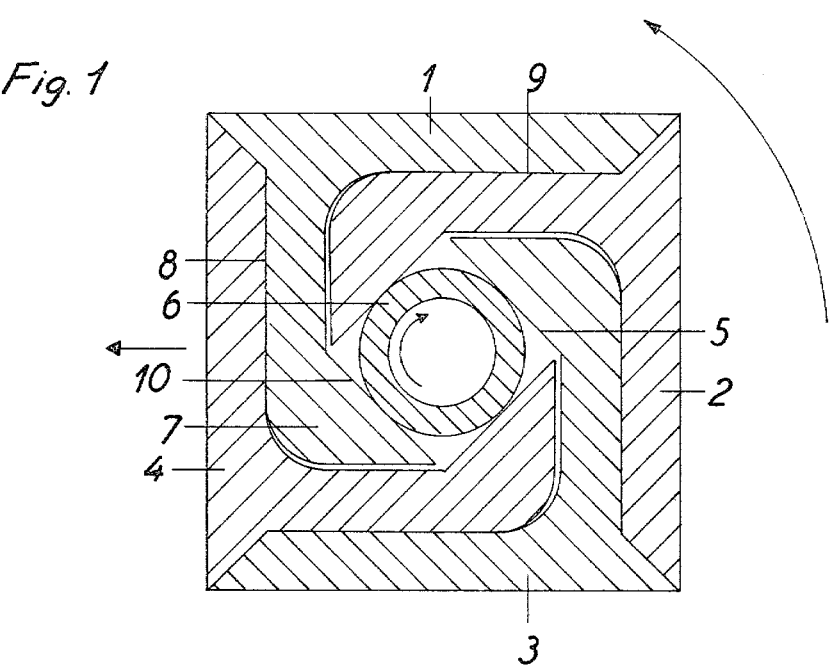

United States Patent [19]

Vinther

[11] 4,333,357
[45] Jun. 8, 1982

[54] EXPANSION ELEMENT

[76] Inventor: Knud Vinther, M-o-llegårdsparken 4, DK-8355 Ny Solbjerg, Denmark

[21] Appl. No.: 157,924

[22] Filed: Jun. 6, 1980

[51] Int. Cl.³ .................... F16H 21/44; F16H 25/18
[52] U.S. Cl. .................................... 74/110; 14/99 R; 81/128; 403/350
[58] Field of Search ............... 74/99 R, 110; 81/DIG. 10, 442–449, 126, 128, 129, 179, 57.21, 53, 54; 411/32, 33, 24, 25, 75, 79, 80, 15, 63; 403/DIG. 7, 350, 374, 316, 319; 257/212; 192/46

[56] References Cited

U.S. PATENT DOCUMENTS

| 186,016 | 1/1877 | Porter | 81/DIG. 1 |
|---|---|---|---|
| 599,837 | 3/1898 | Harris | 81/DIG. 1 |
| 743,681 | 11/1903 | Bossell | 403/350 |
| 808,992 | 1/1906 | Lawson | 403/350 |
| 822,769 | 6/1906 | Quist | 294/89 |
| 877,773 | 1/1908 | Holm | 81/128 |
| 1,316,862 | 9/1919 | Persson | 74/99 |
| 1,366,647 | 1/1921 | Gooding | 81/446 |
| 2,543,683 | 2/1951 | Arisman | 411/63 |
| 2,778,260 | 1/1957 | Jovanovich | 81/53 R |
| 3,329,396 | 7/1967 | Heaton et al. | 251/212 |

FOREIGN PATENT DOCUMENTS

| 2355525 | 8/1974 | Fed. Rep. of Germany | 81/53 R |
|---|---|---|---|
| 2000417 | 9/1969 | France | 411/71 |
| 911685 | 11/1962 | United Kingdom | 251/212 |

Primary Examiner—Lawrence J. Staab
Attorney, Agent, or Firm—Ladas & Parry

[57] ABSTRACT

An expansion element comprises a plurality of identical hook or spiral shaped members which are interleaved such that when one of the members is caused to move radially outward it cooperates with adjacent members to move them outward also. The outward movement may be initiated by a centrally located plug which may either rotate or move axially.

9 Claims, 25 Drawing Figures $$y1 = y2 = y3 = y4 = 90° - \frac{180°}{n}$$

$$y1 = y2 = y3 = 90° - \frac{180°}{n}$$

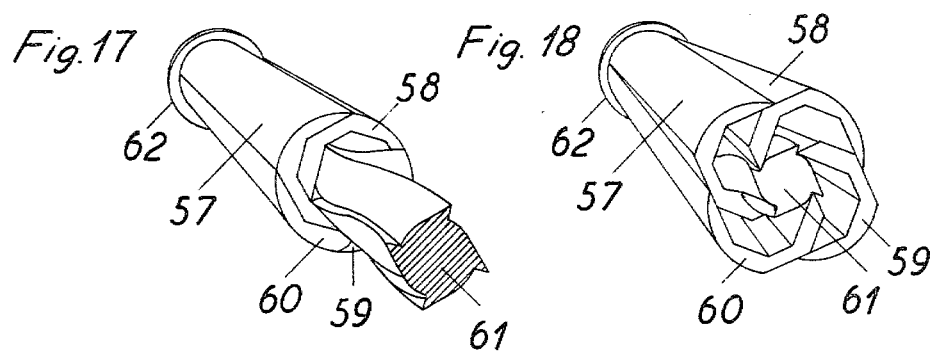
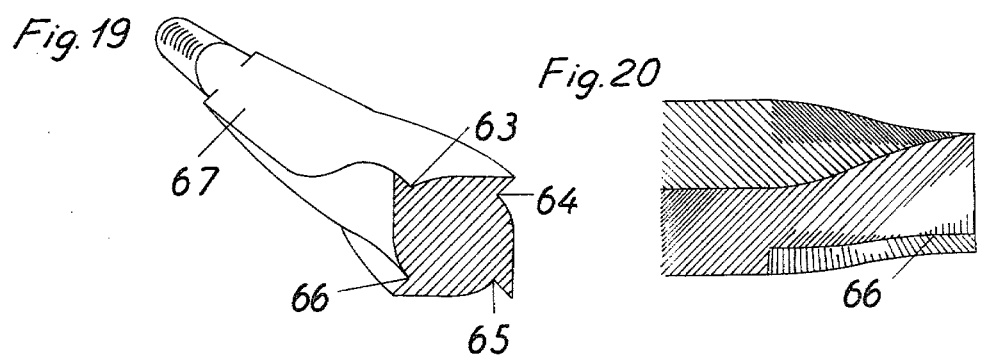
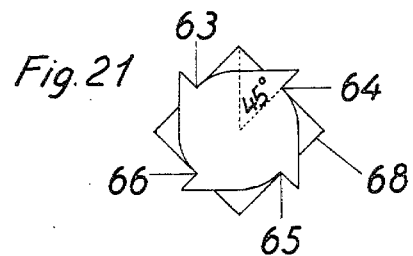

EXPANSION ELEMENT

This invention concerns an expansion element consisting of an axle pivotable in relation to elements surrounding it, slidably or pivotably embedded and coupled with the axle in such a manner that a turn of the axle in relation to the elements will cause a movement of these with components in radial direction.

There are many types of elements consisting of several parts designed to expand in various directions at right angles away from an axle or in opposite directions. Examples of these are brake blocks for drum brakes, threaders, free-wheeling units and blende mechanisms.

A common feature of all these types of mechanisms is that the movable parts have all been embedded or suspended in fixed parts, and that the movements are generated by a relative displacement or turn between these fixed parts and those movable.

The expansion element to the invention is characteristic in the elements viewed in a cross section at right angles to the axle being hook- or spiral-shaped, that the sections of the elements are more or less identical, that the elements in their innermost position will together form an axially running duct shaped like a regular prism the section of which is shaped like a regular polygon the sides of which are tangent to the axle, that the axle is in mesh with at least one of the elements in the tangent point and along the appertaining polygon side, the following first condition having been met:

$$y_1 = y_2 = 90° - 180°/n$$

where n is the number of sides of the polygon, $y_1$ is the angle between the tangent surface of an element and one sliding surface of this element, this surface being a plane surface, and $y_2$ is the angle between the same tangent surface, the following second condition having been met:

A radial surface running from the axle to one of the polygon edges shall be parallel to the sliding surface along the back of the spiral-shaped element the innermost end or point of which is nearest to the radial surface.

The effect of this element derives from a geometric discovery in that it turns out that if an element to the invention is used, the polygon will retain its area. In this manner, the elements actually control each other reciprocally during the movements away from or towards the axle.

To the invention, the axle may be toothed along the entire periphery and be in mesh with all the elements. Thus, an even distribution of the forces is attained.

Another mode of design of this element is characteristic in the axle having been designed as an expanding element. Thus, it will be possible to deform the elements very slightly in arbitrary positions, and it will thus be possible in any position to interlock the elements by friction. This effect may be enhanced if, to the invention, the spiral-shaped parts have been shaped so that there will be open space between them in the innermost position at the surfaces which are not sliding surfaces or contact surfaces.

This invention also concerns further developments in which the angle $y_1$ is different from the angle $y_2$. When these angles are different, the area of the polygon will vary, and it will then be possible to use the insides of the polygon for holding or pressing around an object, for instance in the case of threading when the elements are conducted either inwards or outwards.

Another further development which does not include an axle is characteristic in that the axially running duct, formed by the elements and shaped like a regular prism, has been filled out by a prismatic body of the same shape. Thus, a new mechanism has been found in the case of which the movements of the elements have been uniquely determined based on the position of one of the elements in the same manner as above but in a manner independent of the position of the prismatic body—which cannot be changed. A mechanism of this type could for instance be used as a centrifugal clutch for by rotating the prismatic body around the axle you will be able to throw the elements outwards in a synchronous movement towards a cylindrical clutch facing.

The invention is further explained in the following with reference to the drawing where FIG. 1 shows a section in an expansion element to the invention consisting of four elements, shown in the innermost position, FIG. 2 the same but having the elements in the outermost position, FIG. 3 a section in an expansion element to the invention consisting of five elements, shown in the innermost position, FIG. 4 a section in an expansion element to the invention, consisting of three elements, shown in the innermost position, FIG. 5 a mode of design of a type similar to the one shown in FIG. 1

Figure 9:
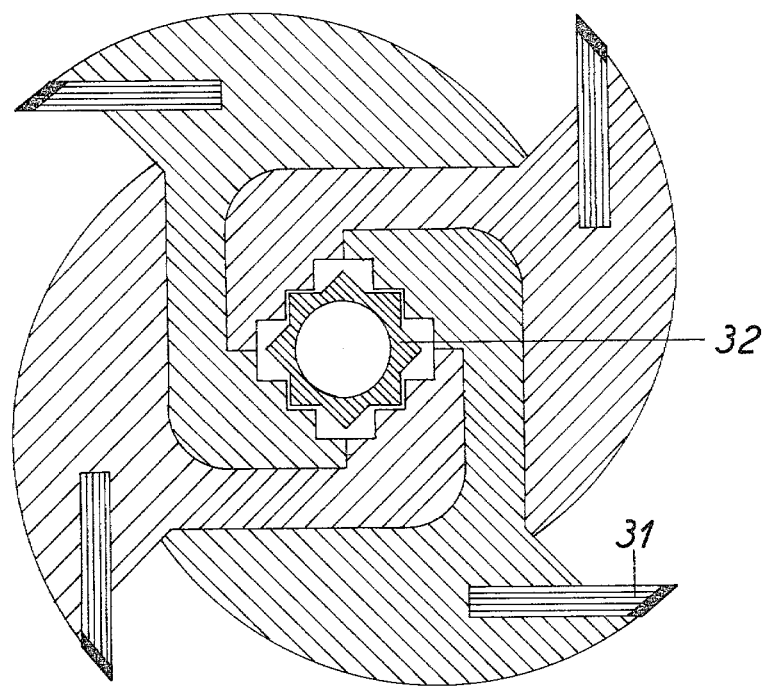
Figure 10:
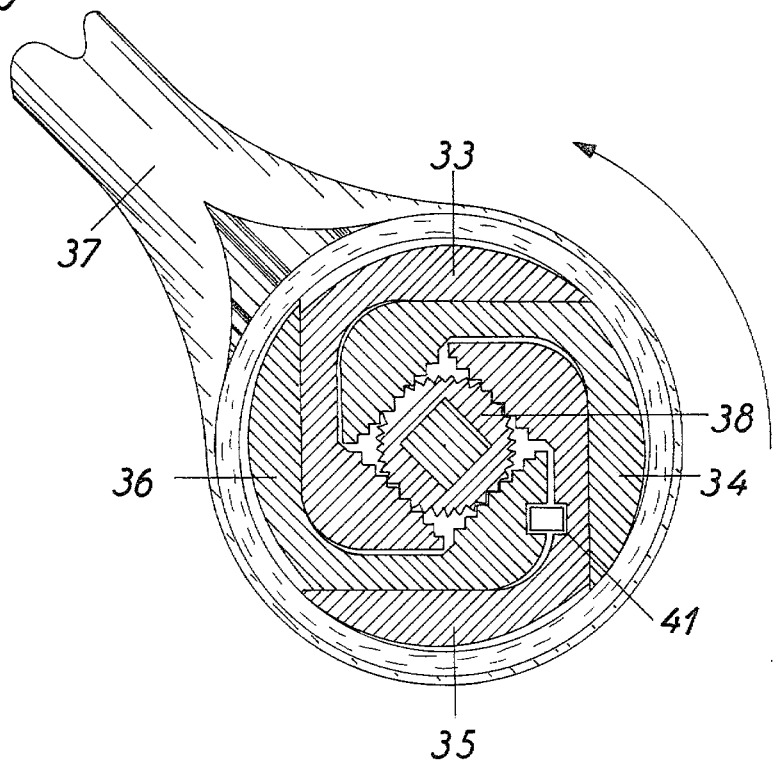
Figure 11:
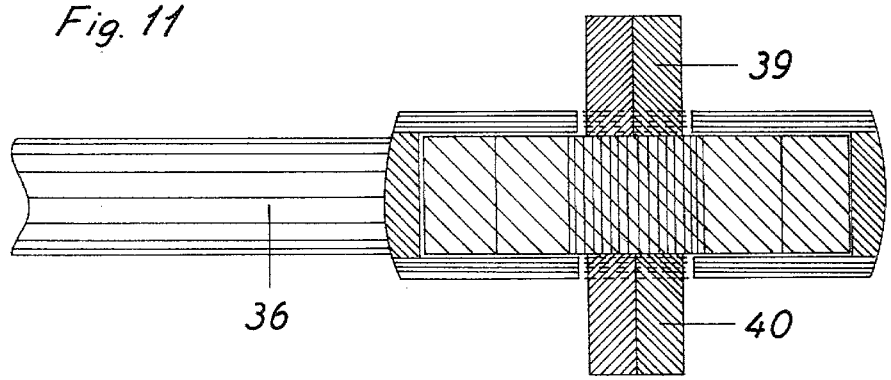
Figure 12:
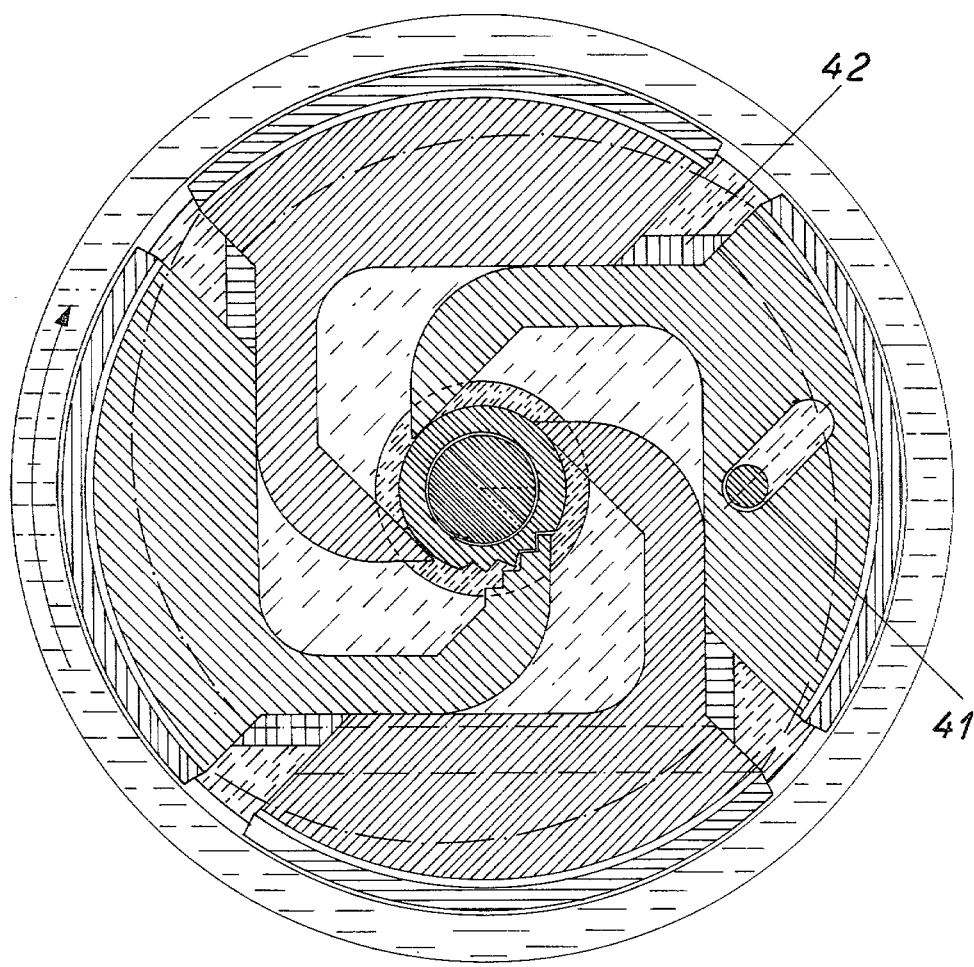
Figure 13:
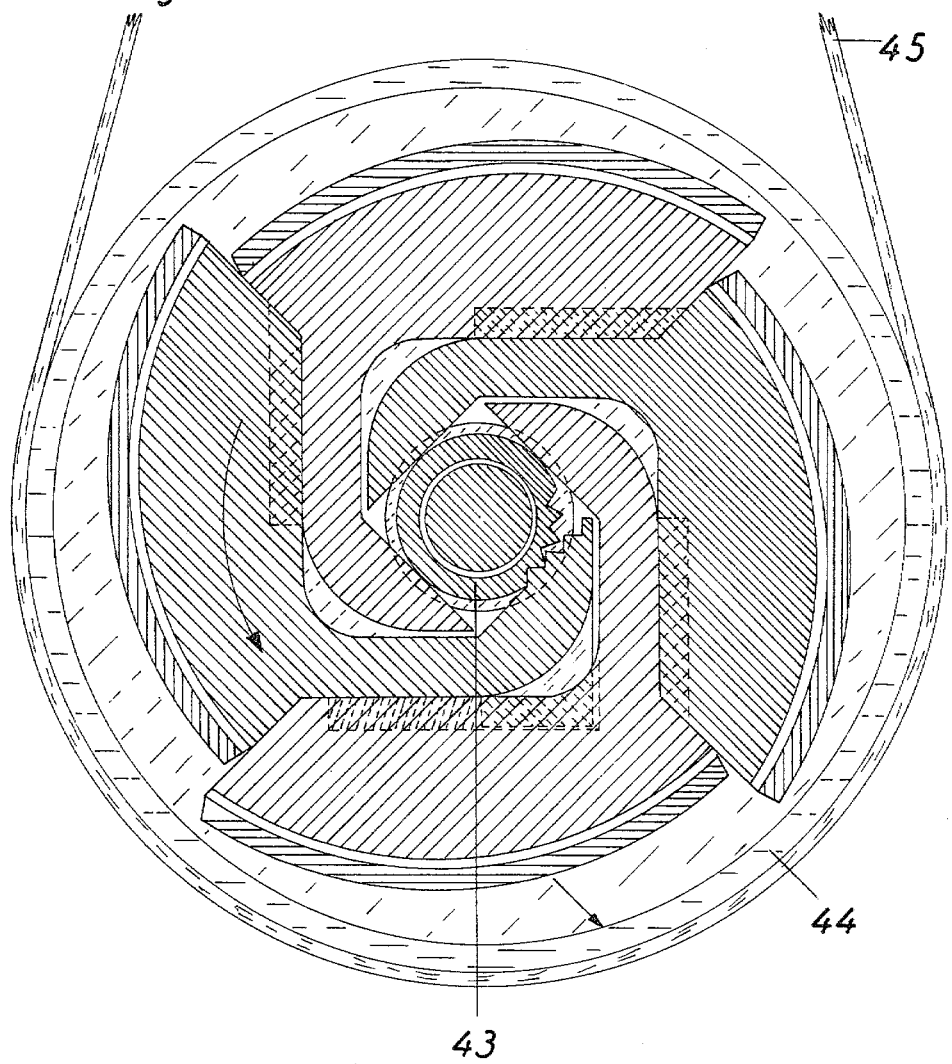
Figure 15:
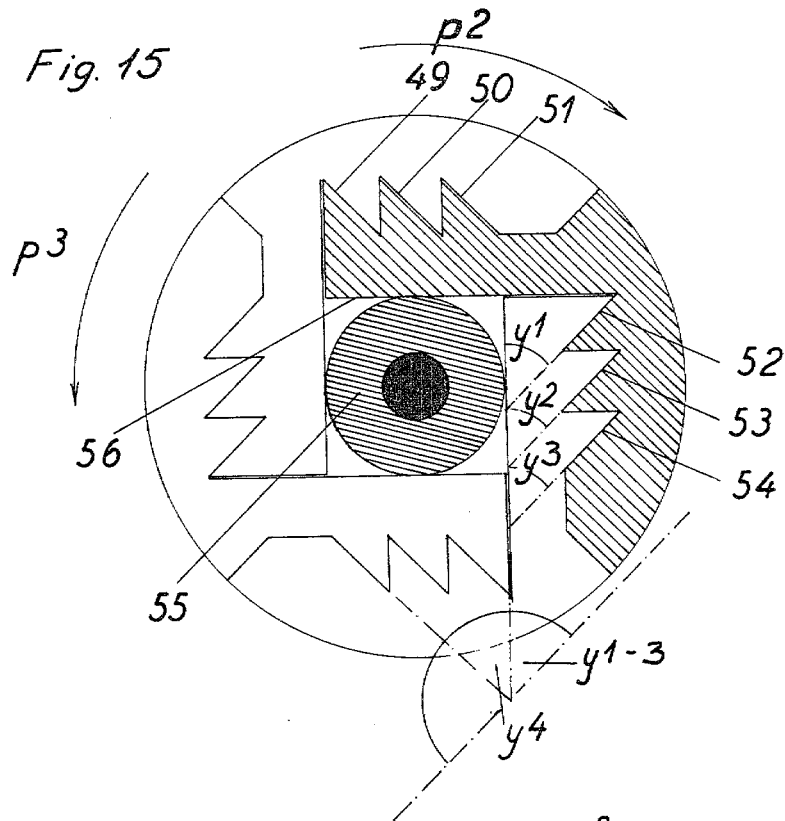
Figure 16:
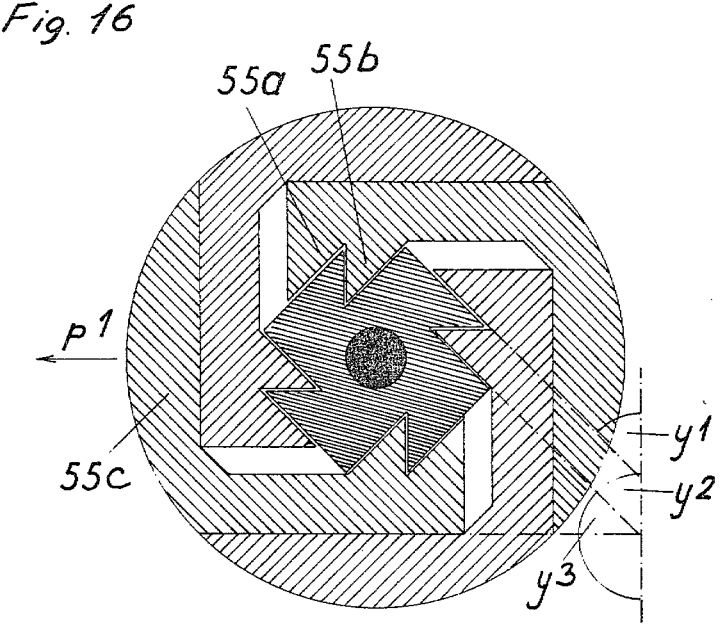
Figure 22:
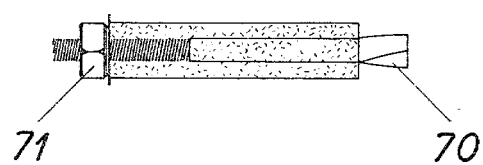
Figure 23:
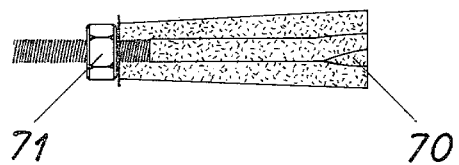
Figure 24:
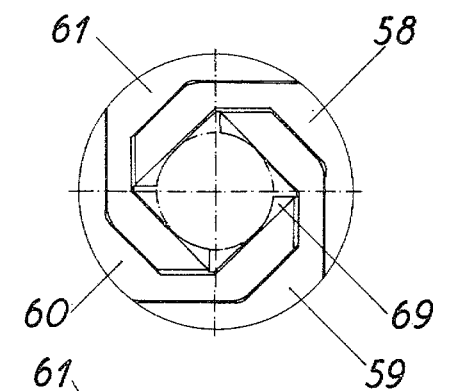
Figure 25:
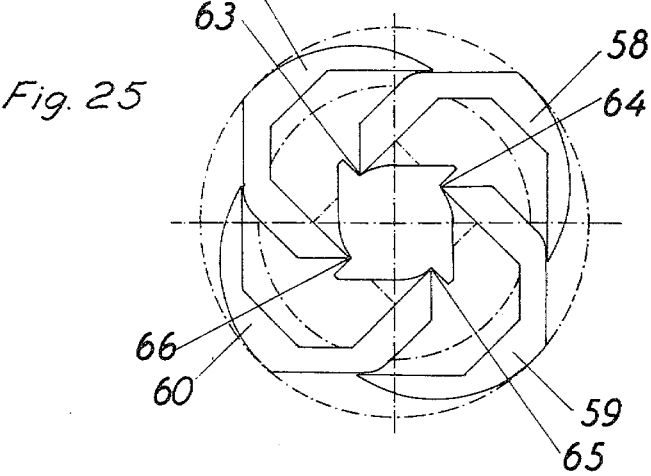

FIG. 6 the same,

FIG. 7 the same,

FIG. 8 the same,

FIG. 9 a section in a cutting tool with adjustable diameter,

FIG. 10 a screw spanner with a free-wheeling device, viewed from above,

FIG. 11 this spanner viewed from the side and partly in section,

FIG. 12 a section in a brake drum,

FIG. 13 a section in a free-wheeling mechanism,

FIG. 14 a section of an element according to the invention, consisting of four part elements FIG. 15 an expansion element according to a second embodiment FIG. 16 an expansion element according to a third embodiment FIG. 17 an expansion bolt according to the invention shown in perspective from the innermost end FIG. 18 the same, but the inner end expanded FIG. 19 the proper inner bolt part to the expansion bolt, shown in perspective from the innermost end FIG. 20 the innermost end of the bolt part, shown from the side FIG. 21 bolt part shown from the inner end FIG. 22 the expansion bolt on a smaller scale, shown from the side FIG. 23 the same, but in an expanded position FIG. 24 the total expansion bolt on a larger scale, shown from the inner end, and FIG. 25 the same, but in an expanded position.

FIG. 1 shows a section 7 in an expansion element to the invention consisting of four identical part elements 1, 2, 3, and 4. These elements together enclose a room 5 with a square section, a polygon in which a hollow axle 6 has been written. The element 1 has a hook- or spiral-formed part 7. The element 1 has further been designed with plane sliding surfaces 8 and 9 bearing against corresponding surfaces at the neighbouring elements 2 and 4. The element 1 is tangent to the axle 6 at a contact face 6 which is plane, too.

Figure 2:
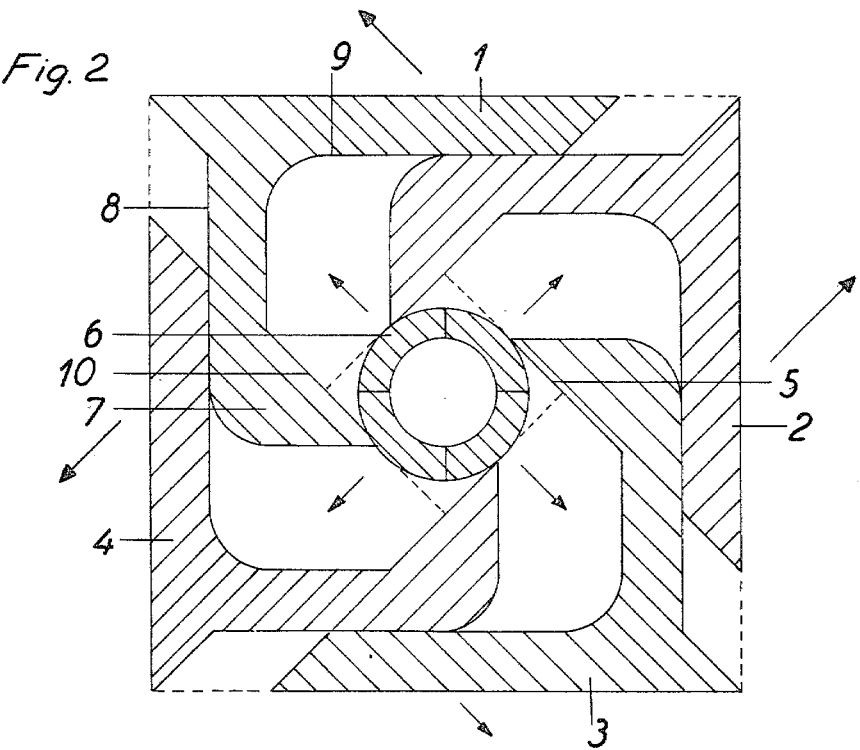

FIG. 2 shows the same expansion element but in this case the parts have been pulled out from each other. The same reference figures have been used in FIG. 1 and FIG. 2. As would appear from FIG. 2, room 5, established at the contact face 10 and the other contact faces, will retain its size, and this very geometric characteristic has been utilized for this invention. It is easily comprehended that the geometric conditions for this have been met in the case of the mode of design having four elements as shown in FIG. 1 and FIG. 2 where the contact face 10 will halve the right angle between sliding faces 8 and 9.

It is, however, possible to have the geometric conditions met for any number n of part elements.

Figure 3:
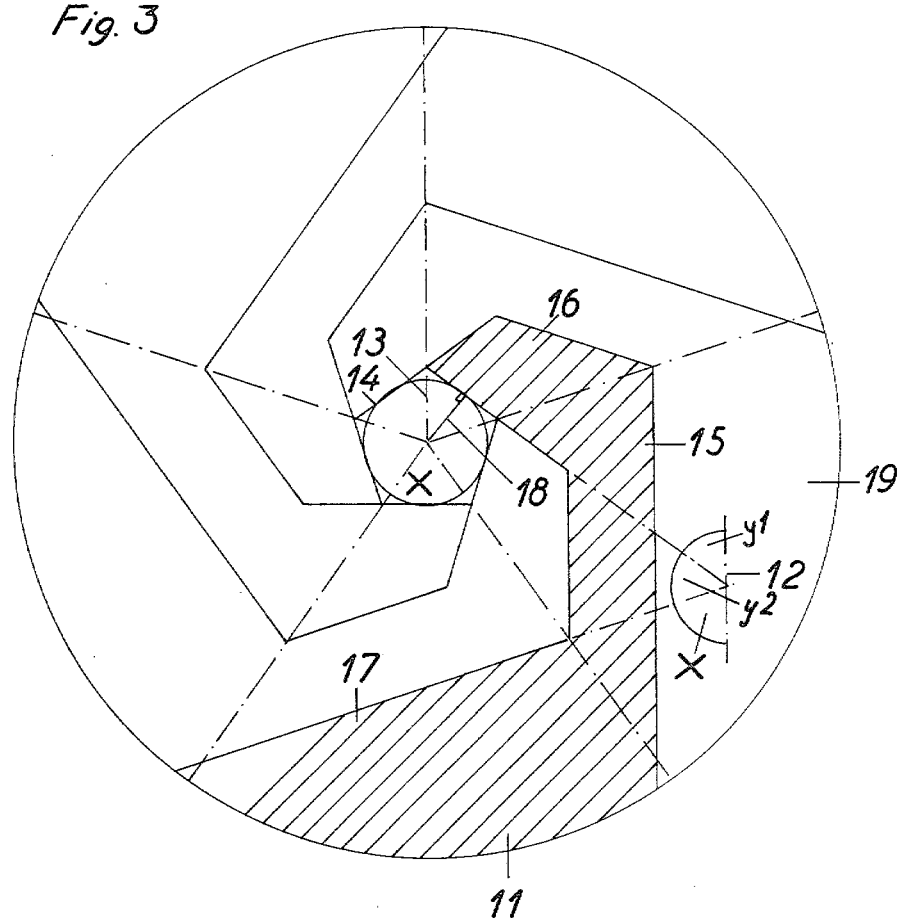

FIG. 3 shows a mode of design with four part elements in which case we shall consider the element hatched. In this case, an auxiliary angle has been introduced the base 12 of which is parallel to a radial 13 in the polygon 14 and to the sliding surface 15 along the back of the hook- or spiral-shaped element 11. At the auxiliary angle shown $y_1$ is the angle between the tangent of the element 11 or the contact face 16 and the element sliding surface 15, $y_2$ is the angle between the same tangent or the contact surface 16 and the other sliding surface 17 of the element. When considering the sum of the angles of the right-angled triangle which has the base line 18 in a polygon section, you will find:

$$y_1 + 90 + 360/2n = 180$$

or $$y_1 = 90 - 180/n$$

Since the sliding surface 15 along the back of the element 11 constitutes the other sliding surface at the neighbouring element 19, you will see that $y_1$ must be equal to $y_2$, i.e., $$y_1 = y_2 = 90 - 180/n$$

would appear to be the relation pertaining when the sliding surface 15 is placed parallel to the radial 13. Thus, the following applies to FIG. 3

$$y_1 = y_2 = 54°$$

Figure 4:
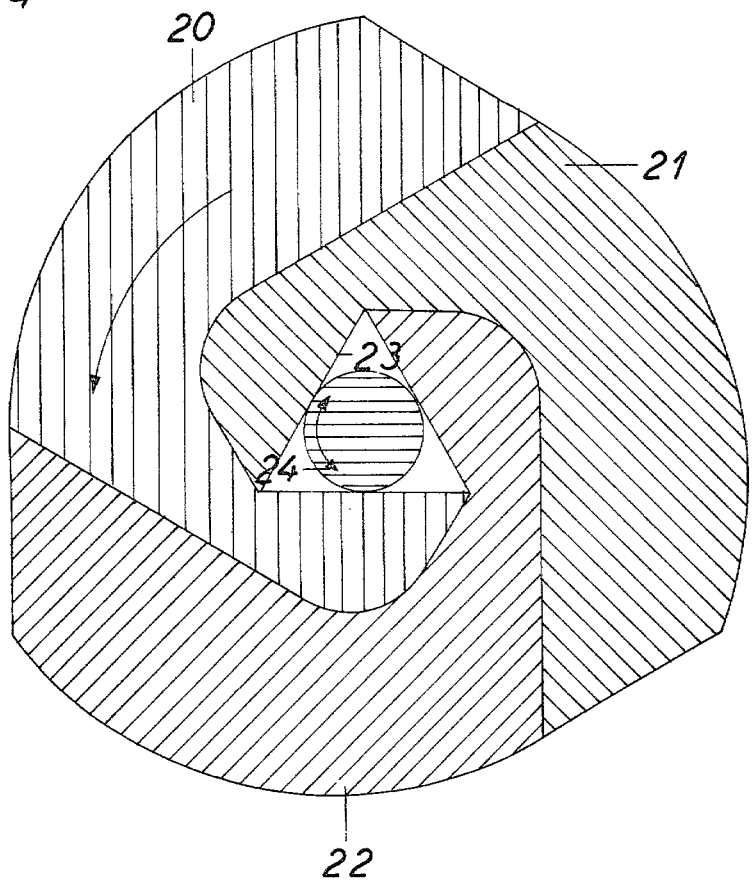

FIG. 4 shows a similar design with three part elements 20, 21, and 22 whichtogether form a room shaped like a regular prism with a section of an equilateral triangle 23 and enclose an axle 24 designed to roll on the tangent contact faces. In the case of this design, $y_1 = y_2 = 30°$.

The following figures would illustrate how these geometric recognitions could be used for practical purposes, for instance new movement mechanisms.

Figure 5:
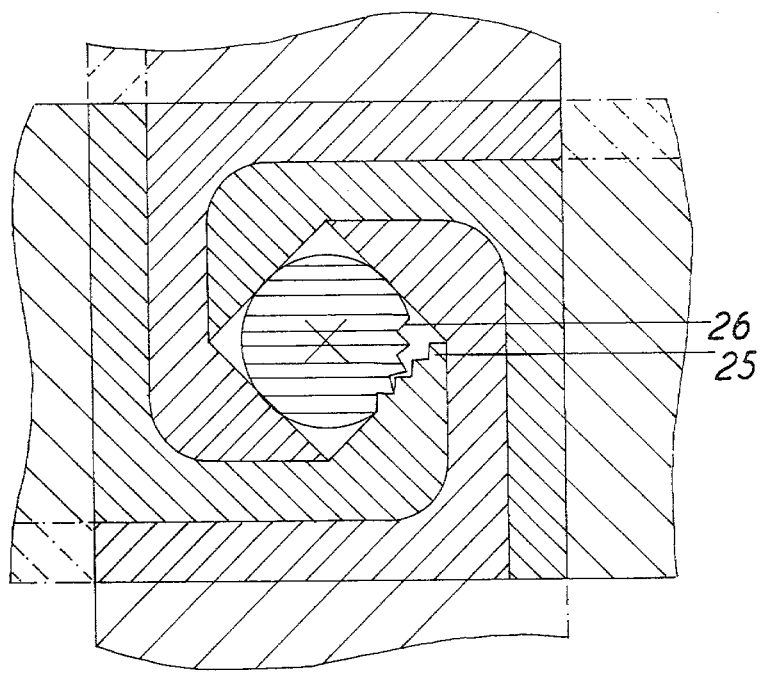

FIG. 5 shows a mechanism with four part elements in the case of which one of the elements has a toothed contact face 25. The axle is on a part 26 of the periphery also toothed and in mesh with the contact surface 25. By turning the axle you will be able to attain that the parts move from each other, and by turning in the opposite direction that they will move back towards each other again.

Figure 6:
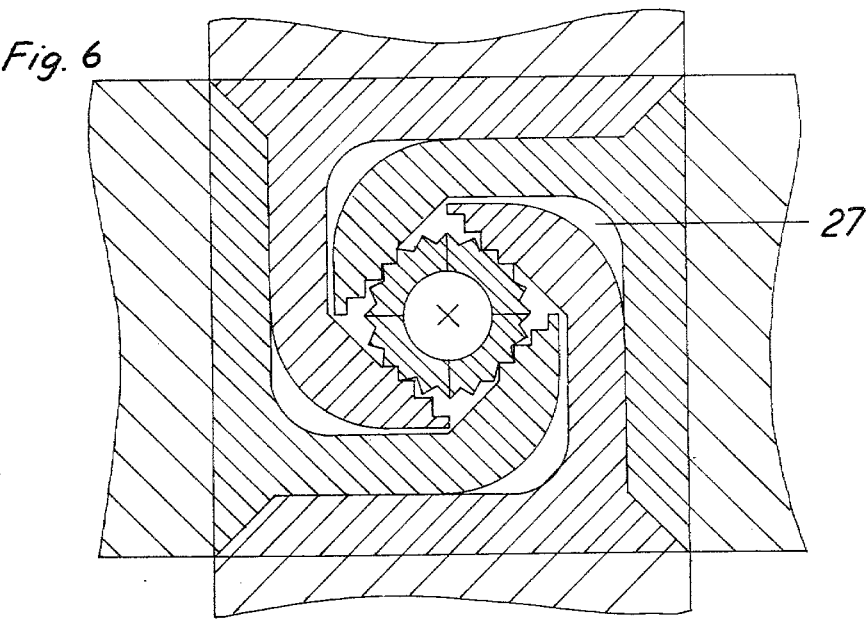

FIG. 6 shows a similar design in which all the contact faces are toothed, and so is the axle along the entire periphery. In the contracted position shown there is a clearance behind the hook- or spiral-shaped parts allowing these parts to be springy-flexible so as to render the design of a good meshing possible. It should be stressed in this connection that the individual part elements do not have to be identical. The geometrical conditions apply solely to the sliding surfaces and to the contact faces.

Figure 7:
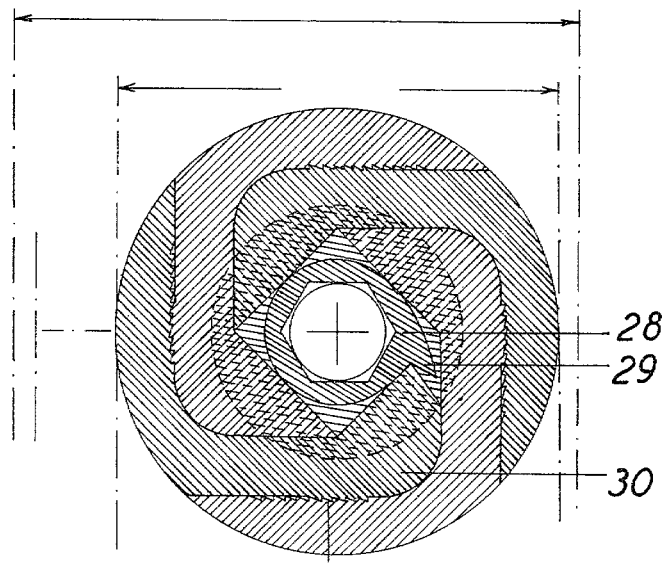

FIG. 7 shows an expansion element the outer shape of which in the contracted position is cylindrical. An axle part 28 has a protruding cam 29 in mesh with one of the elements 30. In the sliding surfaces, barbs 30a have been worked out.

Figure 8:
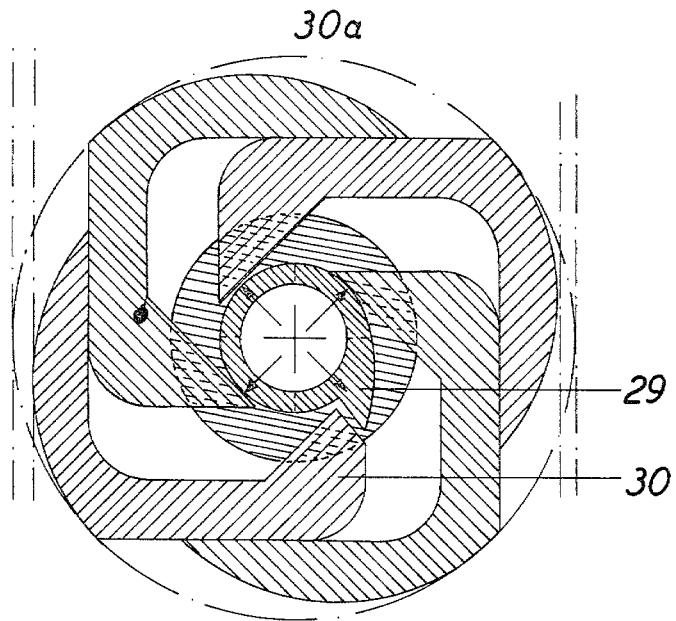

FIG. 8 shows the same element in an expanded position, and you will notice that the cylindrical shape has been retained in the main at the somewhat higher periphery. This element is, therefore, highly suitable for attachment in a hole in the same manner as is a wall plug.

FIG. 9 shows a cutting device consisting of four part elements, coupled together like the parts in FIG. 6. Thus, you may adjust the radius of the knives 31 by turning the axle 32. In this connection, you would use a locking device not shown between the axle 32 and the other parts.

FIG. 10 and FIG. 11 show a screw spanner with a free-wheeling mechanism to the invention. Four part elements 33, 34, 35, and 36 are enclosed in a barrel-shaped room at the end of the key 37. The four elements have been coupled together like the elements in FIG. 6, and at each end of the axle 38 an actually known key coupling 39 and 40 has been made. Between parts 34 and 35, an outward springy element 41 has been pressed in. If you look at FIG. 10, a turn of the axle clockwise as shown by the arrow—or rather a turn of the key 37 in the opposite direction—will cause this to turn freely in relation to parts 33, 34, 35, and 36. A turn in the opposite direction will cause all the parts to be in mesh with each other since the springy element will first make the parts bear against each other.

FIG. 12 shows a brake drum working to the principle to the invention since a pin 41 has been built in and is connected to a fixed part not shown and projects into a notch in one of the part elements which have been designed as brake blocks. To ensure good inter-control between the movable part elements, these have been designed with longitudinal control flanges or control ribs 42 controlling in corresponding slots in the neighbouring element. As you would know, it is difficult in the case of ordinary brake drums with two blocks to make these exercise an even pressure over the entire brake surface because the blocks are pivotable around axles lying close to the drum surface. In the case of this design, the geometry is more advantageous in this respect, and besides it is compact since the individual part elements constitute controls for each other, rather than being controlled by fixed elements, such as is the case when using the known technique. This is a highly decisive characteristic of this invention and of the mechanisms one may thus point to.

FIG. 13 shows a free-wheeling mechanism which at the same time works as a centrifugal clutch since a spring not shown has been designed to keep the part elements in the innermost position. The axle 43 rotates clockwise and will then cause the part elements to move away from each other depending both on the acceleration in the rotating movement of the axle and on the centrifugal force working on the elements depending on the number of revolutions. When you increase the number of revolutions of the axle appropriately, the elements will, shaped like clutch blocks, be in mesh with the inside of a drum driving a chain or a belt 45 a diagram of which has been shown.

FIG. 14 shows an embodiment of an element where the hook-formed parts 46 are reversed in comparison with the ones shown previously, i.e., the hook-formed parts 46 stretch into a carving 47 in the basis 48 of the neighbouring element. As it can be seen, the angle $y_1 > y_2$, which really means that more or less this is the opposite of an expansion element. For instance, if you try to move the part elements away from each other, the movement will be stopped by the axle- or locking element 46a the back 46b of the hook-formed parts 46 being pressed towards the axle 46a. When, as shown, $y_1 > y_2$, the area of the polygon circumscribing the axle- or locking element 46a—in this case a square—will be reduced. This effect can be utilized in threaders for instance. In the embodiment shown, the element is designed to be an assembly element to plates 47a and 47b fixed to the part elements 48a and 48b by an angle joint whereby in the assembling of elements the locking element 46a was pushed in last in the edge direction of the angle joint, i.e., at right angles to the plane of the paper the various parts having been engaged with each other preferably at right angles thereto.

FIG. 15 shows a similar embodiment with 6 sliding surfaces 49–54 in each element. The cylindrical steering element 55 in the middle could be designed with a toothing intended to engage with one or several of the reverses 56 of the hook-formed parts. Thus, when the axle 55 moves in the direction shown by the arrow P2, the four part elements will expand away from each other. The same will, of course, occur if the axle 55 is fixed and the parts are rotated as shown by the arrow P3. This embodiment which—as you will see—is shown very much schematized could for instance be applied for a drum brake as in this way the total energy would be distributed regularly, i.e., both activation energy and frictional force.

FIG. 16 shows an expansion element of which the hook-formed part of each part element is designed as double flanges 55a and 55b with parallel sliding surfaces. By drawing the part element 55c in the direction of the arrow P1 and the other part elements in different directions in the same way, they will move away from each other.

FIGS. 17–24 show an expansion bolt according to the invention and could be viewed together as through parts bear the same reference numbers.

In FIGS. 17 and 18 is shown the total bolt consisting of 4 part elements 57–60 and a core element or a proper bolt part 61. At the outer end there is a thrust plate 62 and a nut screwed on to the outer end of the bolt part 61. When the bolt part 61 has been drawn into the assembled expansion element, as shown in FIG. 18, the inner end of the latter is expanded due to the bolt part 61 being performed with four screwlined traces 63–66 as shown in FIGS. 19–21 and 24–25, at the inner end. In the embodiment shown, the neck of bolt part 61 is square as shown at 67 of FIG. 19, 68 of FIG. 21 and 69 of FIG. 24.

FIGS. 22 and 23 show the length of the neck compared to the protruding part of bolt part 61 which has screwlined traces as indicated at 70 of the figures which show the above mentioned nut 71, too.

As mentioned above, the mechanisms shown in the figures serve merely to illustrate that this invention may be used in connection with various mechanisms, and obviously one could refer to many more fields of application for the invention.

The essential point of the invention seems to be that during their radial moving in and out the elements are steered by each other, i.e., without the use of fixed gliding guides or surfaces.

Further, it should be stressed that, of course, the invention is not limited to the embodiments where $y_1 = y_2$ which is also evident from the claims.

I claim:

1. An expansion mechanism comprising n (where n is an integer greater than 2) substantially identical hook-shaped or spiral-shaped elements disposed in a circular array about a central axis so that each element has first and second adjacent elements, and each element having first, second and third portions each having an inner surface and an outer surface, the inner surfaces of said first portions respectively defining a regular n-sided polygonal chamber, the center of which lies on said central axis, the outer surfaces of said second portions respectively being sliding surfaces, and the inner surface of said third portion of each element being a sliding surface which is in sliding contact with the outer sliding surface of the second portion of said first adjacent element, whereby upon linear displacement of one of said elements in a direction along that side of the polygon which is defined by the inner surface of said first portion of that element, sliding movement of the outer surface of the second portion of that element along the inner surface of the third portion of the second adjacent element, and of the inner surface of the third portion of that element along the outer surface of the first adjacent element, causes said adjacent elements to be displaced correspondingly, between a first condition in which the outer surfaces of the third portions respectively are relatively close to said central axis and a second condition in which the outer surfaces of the third portions respectively are relatively distant from said central axis.

2. An expansion mechanism according to claim 1, further comprising an axle member fitted in said polygonal chamber in meshing engagement with at least one of said inner surfaces of said first portions respectively, whereby upon rotation of said axle member relative to said elements, each of said elements is caused to undergo linear displacement in a direction along that side of the polygon which is defined by the inner surface of said first portion of that element.

3. An expansion mechanism according to claim 1, wherein the following condition is met:

$$y_1 = y_2 = 90° - 180°/n$$

where $y_1$ is the angle defined by the inner surface of said first portion of an element and the outer surface of said second portion of that element, and $y_2$ is the angle defined by the inner surface of said first portion of said element and the inner surface of said third portion of said element.

4. An expansion mechanism according to claim 1, wherein the following condition is met:

$$y_1 > y_2$$

where $y_1$ is the angle defined by the inner surface of said first portion of an element and the outer surface of said second portion of that element, and $y_2$ is the angle defined by the inner surface of said first portion of said element and the inner surface of said third portion of said element.

5. An expansion mechanism according to claim 1, wherein the following condition is met:

$$y_1 < y_2$$

where $y_1$ is the angle defined by the inner surface of said first portion of an element and the outer surface of said second portion of that element, and $y_2$ is the angle defined by the inner surface of said first portion of said element and the inner surface of said third portion of said element.

6. An expansion mechanism according to claim 2, wherein said axle member is toothed about its periphery and is in meshing engagement with the inner surfaces of the first portions respectively of each element.

7. An expansion mechanism according to claim 2, wherein the axle member is an expanding member.

8. An expansion mechanism according to claim 1, wherein an open space is provided between adjacent elements when the elements are in said first condition.

9. An expansion element according to claim 1, further comprising a prismatic member fitted in said polygonal chamber.

* * * * *